June 30, 1970  E. E. HUNTER  3,517,425
APPARATUS FOR CONVEYING AND STRETCHING TIRE CORD FABRIC
Filed Feb. 15, 1967  3 Sheets-Sheet 1

INVENTOR.
EDWARD E. HUNTER
BY Bosworth, Sessions
Herrstrom & Knowles
ATTORNEYS

June 30, 1970 — E. E. HUNTER — 3,517,425
APPARATUS FOR CONVEYING AND STRETCHING TIRE CORD FABRIC
Filed Feb. 15, 1967 — 3 Sheets-Sheet 2

INVENTOR.
EDWARD E. HUNTER
BY Bosworth, Sessions
Herrstrom & Knowles
ATTORNEYS

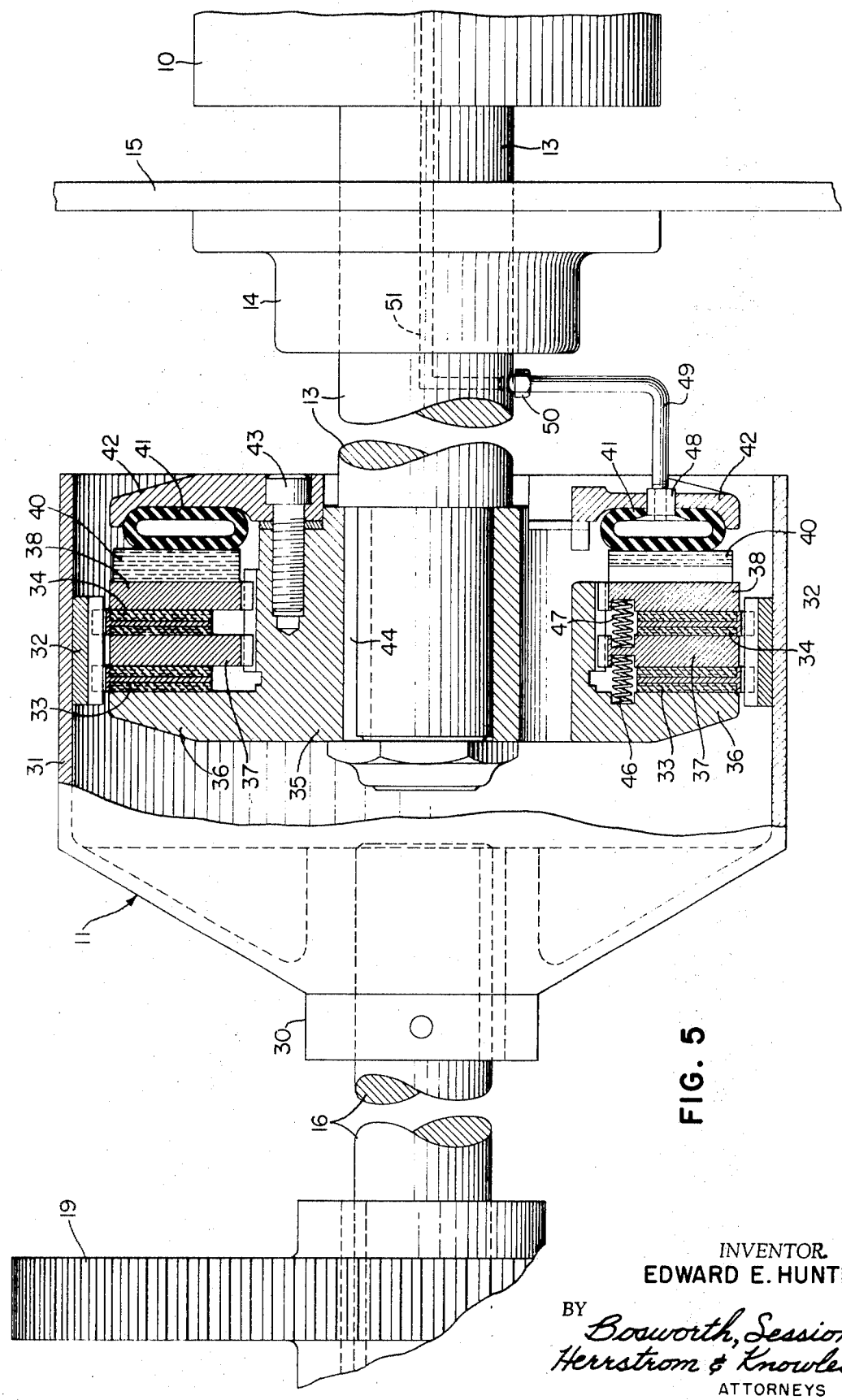

United States Patent Office 3,517,425
Patented June 30, 1970

3,517,425
APPARATUS FOR CONVEYING AND STRETCHING TIRE CORD FABRIC
Edward E. Hunter, Akron, Ohio, assignor to The Goodyear Tire & Rubber Company, Akron, Ohio, a corporation of Ohio
Filed Feb. 15, 1967, Ser. No. 616,337
Int. Cl. D06c 3/00
U.S. Cl. 26—54                              11 Claims

ABSTRACT OF THE DISCLOSURE

Apparatus for tensioning fabric such as tire cord fabric in which the fabric is pulled through one or more treatment chambers under substantial tension. The tension is created in an assembly of hold back rolls and the fabric is elongated during its passage through the assembly. Torque is applied to the shafts of the rolls through friction clutches which slip when a predetermined torque is exceeded, the clutches being adjusted so that the rolls accommodate their speeds to variations in the speed of the web due to the elongation of the material without slippage taking place between the web and rolls. The foregoing abstract is not to be taken as limiting the invention of this application, and in order to understand the full nature and extent of the technical disclosure, reference must be made to the accompanying drawings and the following detailed description.

BACKGROUND OF THE INVENTION

This invention relates to the processing of continuous fabric webs and more particularly to an improvement in an apparatus for processing fabric such as used in forming the plies of pneumatic tires. Fabric of this type ordinarily is composed of textile fibers such as rayon, nylon or polyester and is subjected to tension during processing. The fabric may be either weftless or woven, but normally comprises continuous, parallel, longitudinal cords held in adjacent relation by spaced lateral weft threads, commonly called "pick threads" in the tire fabric art.

In processing tire cord, by way of example, the cord fabric is first coated with a suitable adhesive and then dried and heated while under tension (hot stretched) to impart the desired physical properties to the cords, especially to minimize the extensibility of the cords under the conditions the cords will encounter during the tire building and vulcanizing operations and when the tires are subsequently placed in service. After the dipping and hot stretching, the fabric is passed through calender rolls where it is embedded in an uncured rubber ply compound.

During the drying and hot stretching operation, the cords are passed through ovens at carefully controlled temperature under the tension that is required to stretch them to the desired degree. The cord fabric is ordinarily pulled through the ovens under tension by an assembly of rolls at the delivery end of the ovens and held back by another assembly of rolls at the entry end of the ovens. The rolls in an assembly are generally arranged in staggered relation to one another with the fabric web passed around a portion of the circumference of each roll in the form of a series of connected loops. The friction between the fabric web and the surfaces of the rolls prevents slip if sufficient rolls are used to provide a total frictional force at least equal to the combined tension in the cords.

In the roll assemblies, the speed of the rolls may be controlled by a single mechanism, such as a dynamoelectric machine, through a drive gearing mechanism including a series of 1 to 1 drive pinions intermeshed to turn the shafts of the rolls at equal speed. The rolls at the exit or delivery end of the assembly, generally called "pull rolls," pull the web through the apparatus while the rolls at the entry end, generally termed "hold back rolls," resist the motion of the web through them and thus the desired tension is developed in the web. The dynamoelectric machine at the pull roll assembly acts as a motor while the machine at the hold back roll assembly acts as a generator or brake.

The fabric web and the cords making it up enter the hold back rolls under a rather low tension and leave them at a relatively high tension. By way of example, the tension in the cords leaving the hold back rolls may be about five times as great as the tension in the cords entering the hold back rolls. The increasing tension stretches the cords as they pass through the hold back roll assembly, the elongation being, for example, about ten percent. This elongation takes place between the point of engagement of the web with the entry end of the hold back roll assembly and the point of departure of the web from the last roll at the discharge end of the hold back roll assembly. Since the web is longer when it leaves the hold back roll assembly than when it enters the hold back roll assembly, the speed of the web at the exit end of the hold back roll assembly is correspondingly increased. When the rolls in the hold back assembly are of equal diameter and the drive shafts of the rolls are geared together to turn at equal speeds, the web must slip on the surface of at least some of the rolls. This slippage often results in chattering and serious vibration in the apparatus as well as improper distribution of the load on the rolls and may result in nonuniform stretching of the cords and undesired abrupt increases and decreases in tension as the web passes through the apparatus. It has been found that with this conventional arrangement, the tensile load of the web on the rolls increases progressively from the entry to the exit end of the hold back roll assembly, with the last roll at the exit end of the assembly carrying about half of the total tensile load.

While this problem theoretically could be remedied by using separate motors for each roll to permit variations in speed between the rolls, a drive of this type would be expensive. would require accurate and sophisticated controls and would be impractical for most applications. It would also be possible to utilize different gear ratios for the pinions. Such an arrangement would suit one particular type of fabric under one set of conditions, but it might not be suited to other materials or other conditions where the amount of fabric elongation under tension would differ.

SUMMARY OF THE INVENTION

A general object of the present invention is to provide an apparatus for tensioning fabric such as tire cord fabric in which the above-noted difficulties with prior apparatus are substantially eliminated. Another object is the provision of such an apparatus which can be constructed at reasonable costs and which will be reliable in operation and long-lived. A more specific object is the provision of a roll assembly particularly adapted for fabric tensioning apparatus embodying means to permit the lineal speed of the various rolls to conform substantially to the speed of the web passing through them, thereby to substantially eliminate slippage between the web and the rolls even though the web changes in length as it passes through the roll assembly. Another object is to provide such an apparatus in which the torque transmitted to and from each roll can be adjusted whereby the amount of tensioning produced by each roll of the apparatus can be adjusted.

According to a preferred form of the invention, the foregoing and other objects and advantages of the invention are accomplished by the provision of an apparatus for tensioning fabric embodying means for pulling a web of fabric through the apparatus and an assembly of hold back rolls for resisting the pulling force exerted by the pulling means and thereby developing tension in the fabric, in which the hold back assembly comprises a plurality of rolls mounted on shafts and arranged to have loops of the web material wrapped around a portion of the circumference of each roll, means for controlling the speed of rotation of the rolls including a drive shaft for each roll and gearing interconnecting said drive shafts for positively controlling the speed of said shafts in a predetermined fixed relation to each other and a plurality of friction clutches, each clutch being interposed between one of the shafts driven by the gearing and its associated roll, the friction clutches being adapted to slip at preset torque values to permit variations in the speeds of rotation of said rolls with respect to each other even though the relationship between the speeds of rotation of the shafts remains constant. In this manner, as the web progresses through the assembly of hold back rolls, each roll beyond the roll at the entrance end of the assembly is permitted to rotate with a lineal surface speed slightly greater than the surface speed of the roll immediately preceding it so as to conform to the speed of the fabric in engagement with the surface of the roll, thus eliminating substantial slippage between the fabric and the roll surfaces, preventing chattering and obtaining more uniform action in the machine.

BRIEF DESCRIPTION OF THE DRAWINGS

FIG. 5 is a fragmentary elevational view in an enlarged scale with parts broken away and shown in section, of a disc type friction clutch for the shaft of one of the rolls in accordance with the invention.

DESCRIPTION OF THE PREFERRED EMBODIMENT

Figure 1:
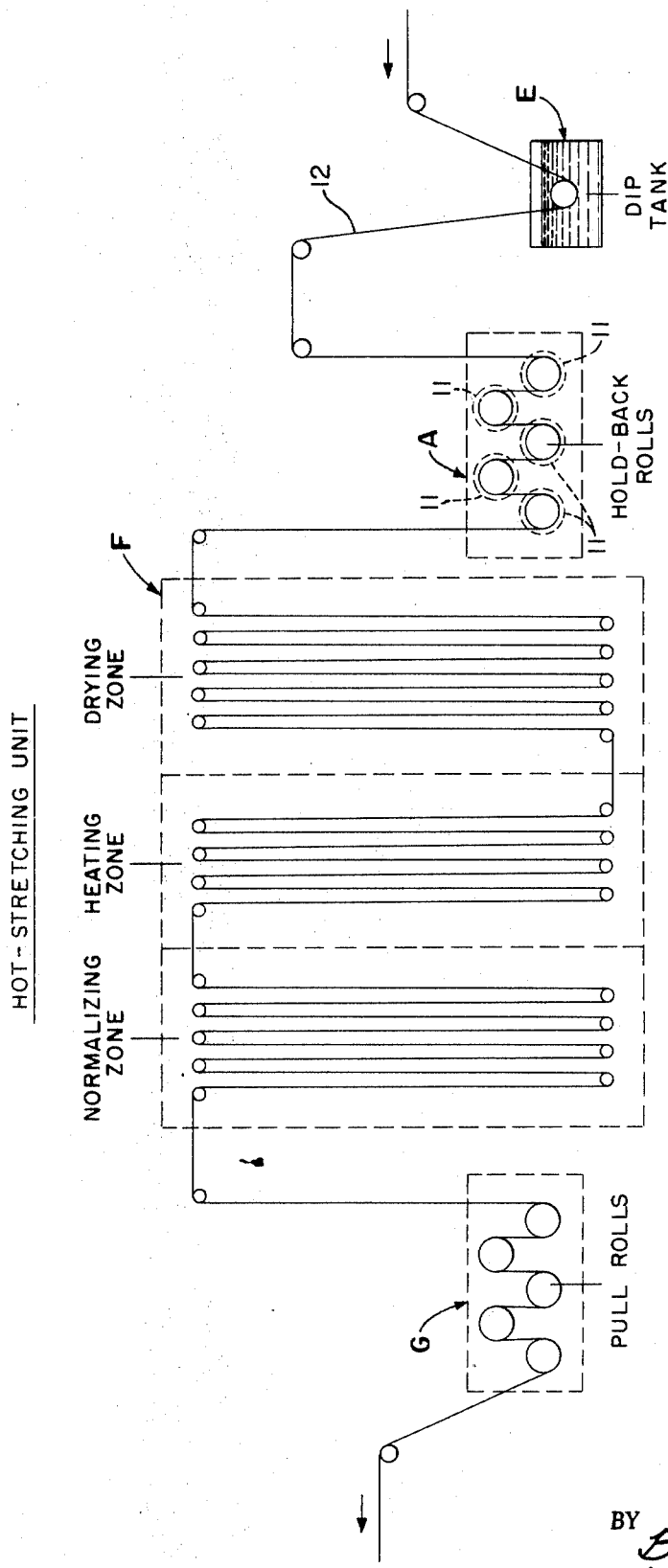
FIG. 1 is a diagrammatic view showing a portion of a tire cord fabric processing line embodying the invention.

A portion of a tire cord fabric processing line is shown diagrammatically in FIG. 1. The processing equipment shown includes a dip tank E for coating the fabric with an adhesive, a hold back roll assembly A, a hot-stretching unit F and a pull roll assembly G. The fabric web 12 passes from right to left through the dip tank E, and thence at a relatively low tension into the hold back roll assembly A. For the purpose of illustration, a web width of about 52 inches and a total of 1,280 longitudinal cords across the web 12 will be assumed. The web tension upon entering the hold back rolls is around 5,000 pounds, or about four pounds per cord.

Upon leaving the hold back roll assembly A, however, the web 12 is under a tension of around 25,000 pounds (about 19.5 pounds per cord) due to the pull exerted by the pull roll assembly G at the exit side of the hot-stretching unit F. In order to maintain the tension in the web as it passes through the hot-stretching unit F the hold back roll assembly A must exert a frictional resistive force on the web to resist the tension. Consequently, the hold back roll assembly A serves both to convey the web through the elements of the processing line that precede it and to exert a resistive force in order to tension the web. In this instance the resistive force which the roll assembly must exert equals the differential between the output tension (25,000 pounds) and the input tension (5,000) or 20,000 pounds. The increase in the tension in the cords elongates them, for example, about ten percent. Assuming a web speed for the purpose of illustration of about 100 yards per minute at the input end of the hold back roll assembly A, the speed at the output end will be about 110 yards per minute, the increased speed resulting from the elongation or stretching of the cords as they pass from a low tension to a high tension condition. Accordingly, the rolls of hold back assembly A must turn at progressively greater speeds from right to left as viewed in FIG. 1 in order to prevent slip.

A preferred form of hold back roll assembly A for accomplishing the desired control of the tension in the web without slippage is shown in FIGS. 2, 3, 4 and 5. As shown particularly in FIG. 2, the assembly A is made up of a series of rolls 10, five rolls being shown in the present example. The tensioning effort of the assembly and hence of the web, is in part, controlled by a single dynamoelectric machine B which, in view of the fact that the web is being pulled through the entire apparatus by the pull rolls G, ordinarily acts as a generator, putting energy back into the line or through appropriate resistors, conventional controls being provided so that the speed and torque of the machine can be controlled. The dynamoelectric machine B is operatively connected through a speed change gear unit C to a pinion assembly D which controls the rotation of the five rolls 10 of the hold back roll assembly. Four of the rolls 10 are operatively connected to their respective pinions through individual friction clutches 11, one clutch being provided for each roll 10 except the first roll 10 at the entry end of the assembly.

Figure 2:
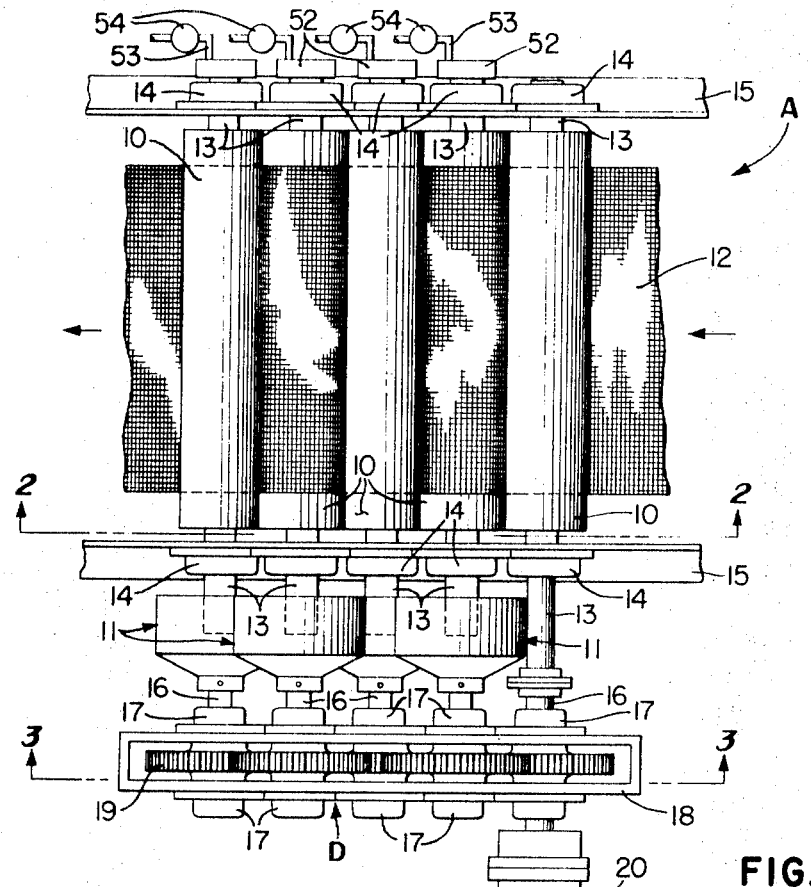
FIG. 2 is a plan view of a preferred form of hold back roll assembly that forms part of the apparatus illustrated in FIG. 1.

The rolls 10 are carried on roll shafts 13 which are journaled at their ends in bearings 14 mounted in a frame 15. As shown in FIG. 2, the rolls 10 are mounted in staggered relation in the frame and the continuous web 12 of textile fabric passes over a portion of the circumference of each roll to form five connected loops. The tension in the fabric holds the fabric tightly against the roll surfaces so that the friction between the fabric and the roll surfaces is sufficient to prevent slippage or substantial slippage between the fabric and the roll surfaces so long as the torque applied to the rolls is properly controlled.

Figure 3:
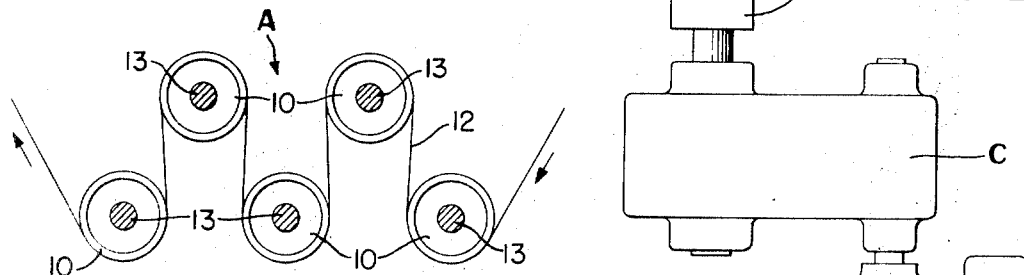
FIG. 3 is a sectional view taken on the line 2—2 of FIG. 2 showing diagrammatically the passage of a continuous length of tensioned textile fabric through the roll assembly.
Figure 3:
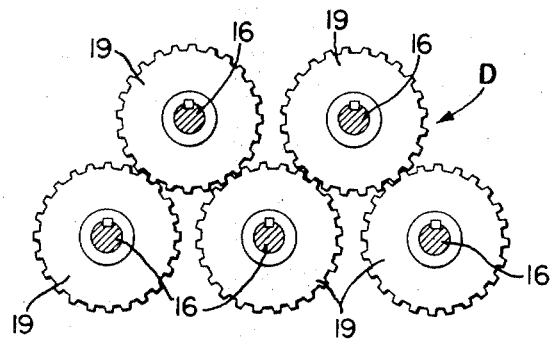
Figure 4:
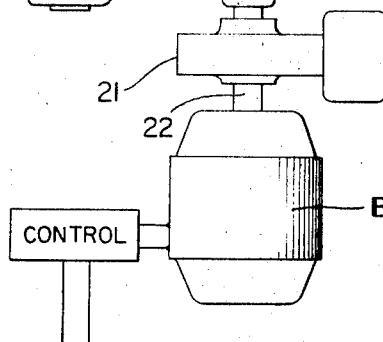
FIG. 4 is a sectional view taken on the line 3—3 of FIG. 2 and showing the gear train for controlling the speed of the roll assembly from a single dynamoelectric machine.

According to the present invention, proper control of the torque applied to the shafts is accomplished by interposing a slip clutch 11 for each of the rolls except the entry roll 10 between the roll shaft 13 and the drive mechanism. Thus each shaft 13 of the four clutch-driven rolls is connected by a clutch 11 to one of five pinion shafts 16, each of the shafts 16 being journaled in bearings 17 mounted in the housing 18 of the drive pinion assembly D. The roll shaft 13 of the roll 10 at the input end of the assembly A or to the right as viewed in FIGS. 2, 3 and 4 is coupled directly to its coaxial pinion shaft 16 so that the entry roll is coupled directly to the pinion assembly D rather than through a clutch. This is the preferred drive as it enables the speed of the web to be controlled positively by the speed of the machine B so long as there is no slippage between the web and the entry roll 10.

The pinion assembly D embodies a series of pinions 19, each of which is keyed to one of the shafts 16 thus providing a gear train of intermeshed pinions. In the present embodiment, the rolls are shown as being of the same size and the pinions are of the same size so that the shafts 16 are driven or rotate at the same speeds, provided there is no slippage taking place in the clutches, the lineal surface speed of the rolls 10 would be identical. It will be appreciated that the identical lineal speed of the rolls can be obtained with rolls of different diameter if the diameters of the pinions are correspondingly varied. The drive pinion assembly D is driven through the shaft 16 associated with the roll at the input end of the assembly in the embodiment shown by a coupling 20 which connects the shaft 16 to the output shaft of the gear unit C. A brake 21 is interposed between the output shaft 22 of the dynamoelectric machine B and the reduction gear unit C to enable the rolls to be stopped while still maintaining the desired tension in the cords of the fabric web 12.

The friction clutches 11 permit the rolls 10 to operate at progressively greater speeds corresponding to the increasing speed of the web as it is elongated in its passage through the assembly A. The construction of one of the clutches 11 is shown in FIG. 5. This is a conventional, air-operated, disc-type friction clutch which is available commercially from the Wichita Clutch Company, Inc. of Wichita Falls, Tex. under the trade designation ATD–218. Each clutch is connected as shown in FIG. 5 to its associated shaft 16 by keying the hub 30 of the clutch to the shaft 16.

The hub 30 is provided with a cylindrical shell 31 having a ring gear 32 secured therein. The ring gear 32 engages external gear teeth formed at the outer rim of two molded friction discs 33 and 34 mounted concentrically of a hub 35. The disc 33 is located adjacent a back plate 36 which is integral with the hub 35. Located between the discs 33 and 4 is a floating plate 37 which has internal teeth that engage external teeth formed in the hub 35 to permit axial movement of the plate 37 but prevent rotation relative to hub 35. Located to the right of the discs 34 as viewed in FIG. 5 is another floating plate 38 which also has internal teeth to prevent rotation but permit axial movement relative to the hub 35.

Located adjacent the floating plate 38 and to the right thereof as viewed in FIG. 5 is a pressure plate 40 which transmits the pressure exerted by an annular inflatable air bladder 41 against the friction discs 33 and 34 and the floating plates 37 and 38 and forces them axially towards the back plate 36. The annular air bladder 41 is located between the pressure plate 40 and a holding plate 42, the holding plate being secured to the hub 35 by cap screws 43. The roll shaft 13 is keyed to the output hub 35 by a key 44 and it will be seen that the torque transmitted by the pinion shaft 16 to the roll shaft 13 is directly related to the fluid pressure within the annular air bladder 41.

The clutch is normally biased toward released condition by means of helical springs 46 and 47, the springs 46 being located in a symmetrical pattern between the back plate 36 and the central floating plate 37, and the springs 47 being located in a symmetrical pattern between the floating plate 37 and the floating plate 38.

Fluid pressure is supplied to the annular air bladder 41 through an air connection 48 which extends through the holding plate 42 and receives an air hose 49. The air hose 49 is connected at its opposite end to a hose fitting 50 on the roll shaft 13. The fitting 50 communicates with a central passage 51 extending through the roll shaft 13 to the opposite end thereof. Air is supplied to passage 51 through a rotary coupling 52 which is connected to fluid conduit 53 that leads to a source of fluid under pressure (compressed air for example) for operating the clutches 11. A pressure regulator 54 is provided for each clutch 11 so that the maximum torque that can be transmitted to each shaft 16 may be individually controlled.

OPERATION

As mentioned above, the fabric web may enter the hold back unit A under a tension of 5,000 pounds and leave it under a tension of 25,000 pounds to provide a total increase of 20,000 pounds, and the speed of the web entering the hold back assembly A may be, for example, 100 yards per minute while the speed of the web leaving the assembly is 110 yards per minute. The overall speed of operation of the pull roll assembly G is adjusted to pull the fabric through the hot stretching unit at the desired speed while the hold back assembly A is controlled to apply the needed resistance to the motion of the web through it to increase the tension on the fabric as it passes through the assembly from about 5,000 pounds to 25,000 pounds. The dynamoelectric machine B is controlled so that when this takes place, there is no slippage between the web and the entry roll 10 of the hold back assembly A. In prior types of apparatus, more or less slippage would take place between the fabric and the succeeding rolls since the surface speed of the rolls would all be equal. However, with the present apparatus, the clutches 11 are adjusted by means of controlling the pressure of the air supplied to them to permit the rolls 10 to turn at progressively greater speeds from entry to the exit end of the unit or assembly, the clutches being adjusted to slip when the torque exerted on the roll by the web exceeds a predetermined limit, which is less than that corresponding to slippage between a roll and fabric. Thus, although all of the pinions 19 and shafts 16 will turn at the same speeds, the rolls turn progressively faster from right to left due to the increasing web speed resulting from the elongation or stretching of the cords and the fabric as it passes between each next adjacent pair of rolls. While the clutches slip to permit the desired increased speed, they transmit a predetermined torque to the pinions and thence back to the dynamoelectric machine B, and this torque and hence the amount of tenson added to the web by the roll with which the clutch is associated remains substantially constant so long as slippage takes place even though the speed of the web may be varied within reasonable limits.

Preferably, the clutches are all set to slip at substanly the same torque, and in the example given, the torque would be such as to increase the tension in the fabric by an amount of 4,000 pounds as the web passes over each roll, thus providing the desired 20,000 pound increase in torque. However, it is not necessary that the torque be equalized. The clutches can be set to slip at increasing levels of torque from right to left so long as the total available torque corresponds substantially to the amount of increase in tension to be put into the web and so long as the clutches are set to slip before slippage takes place between the web and the surface of the rolls.

While slippage does take place constantly in the clutches in normal operation, the slippage is at a fairly slow rate and difficulties are not encountered because of undue wear of the clutches or because of undue heating. This is due to the fact that the hub 30 is not held stationary but rather in driving connection with the dynamoelectric machine B. Therefore, the relative movement between the hubs 30 and 35 of each clutch is substantially less than would be the case if the hub 30 was held stationary. The torque and hence the holding back force applied to the web at each roll remain substantially constant so long as the air pressure applied to each clutch remains substantially constant, and there is no chattering in the clutches since, when the machine is in operation, there is never the problem of transition between static friction and sliding friction in the clutches. Sliding between the web and the rolls, however, is at least substantially eliminated, and chattering and vibration of the machine and distortion of the pick threads of the web which took place with prior types of apparatus is also eliminated. There may be some slight creepage taking place between the fabric and the roll surface because of stretch occurring in the fabric and cords while the cords are in contact with the surfaces of the rolls. This creeping is not troublesome, however, and does not cause problems in the apparatus. The result is improved operation of the apparatus with better control of the tension and reduction in operating problems as compared to conventional apparatus.

While the invention has thus far been described in terms of the specific embodiment shown in the drawings, it will be apparent that modifications could be made without departing from the scope of the invention; for example, slip clutches of a type other than friction clutches could be used. Further, other means or combinations of devices may be employed to provide the desired hold back torque on the rolls while at the same time effecting a speed of rotation of the roll such that the roll surface speed will generally correspond to the speed of the web passing over the roll thus preventing slippage between the roll and the fabric.

In the specific embodiment shown, if there is no load on the rolls the motor B will drive the rolls at a speed determined by the normal motor speed and the gear ratio between the motor and rolls. However, during operation of the hold back rolls the fabric is pulled over each roll, other than the first or entry roll, at a speed which corresponds to a roll speed greater than that at which the roll would be driven by the motor under a no load condition. The direction of movement of the fabric tends to drive the roll in a direction the same as that corresponding to normal rotation of the motor. However, the motor will resist being driven at this rate of speed and thus provide a braking action which provides the tension desired on the fabric. While the use of a motor or generator as a braking device has certain advantages, at least in part as pointed out above, other braking devices, whether individual or common, and which exert a torque or restraint in the proper direction on the rolls, could be used without departing from the scope of the invention.

While the invention is particularly useful in connection with a hold back roll assembly to provide controlled tension on the portion of the fabric extending from one to the next succeeding roll, it also may be used to advantage in the pull roll assembly G. In a tire cord stretching operation, as shown in FIG. 1, the fabric is stretched under heat as it goes through the hot stretch oven or unit and is then cooled under tension to attempt to maintain the elongation previously imparted to the cords. However, when the fabric is passing through the pull roll assembly, there will be at least a tendency for the cords to shrink as they pass between a roll and the next succeeding roll. This is due to the reduction in tension on the cord as it passes from one roll to the other. Such shrinkage can cause slipping between the fabric and pull rolls. Where this slippage presents a problem it is within the scope of the invention to provide means for effecting rotation of the pull rolls at the necessary speed and at the same time providing the necessary controlled tension on the fabric by means at least substantially the same as that described in connection with the hold back rolls. Of course, in the case of the pull roll assembly, the rolls will actually be driven by an electric motor, or the like, and the slippage that is desired is that necessary to effect the rotation of the rolls at a speed less than the speed at which they would be driven at no load. As in the case of the hold back roll assembly, the first or entry roll of the pull roll assembly has its speed preferably controlled directly by an electric motor, or the like, with no control of the speed of rotation of the entry roll except as will occur from any intentional change of the speed of operation of the motor. In a preferred embodiment, a friction clutch would be employed in association with each of the remaining pull rolls of the assembly with the pull roll assembly being generally of the same construction as the hold back assembly described in detail hereinabove.

What is claimed is:

1. In an apparatus for conveying and stretching tire cord fabric, said apparatus including a pull roll assembly and a hold back roll assembly, each assembly having a plurality of rolls arranged to have loops of said fabric wrapped around portions of the circumference thereof, drive means operatively connected to said pull rolls, speed control means for said hold back rolls, and a gear train operatively connecting said speed control means to said hold back rolls, the pull and hold back roll assemblies being adapted to tension the fabric therebetween; the improvement which comprises a slip clutch interposed between said gear train and each hold back roll which successively increases the tension applied on the fabric by the first of the rolls to engage the fabric, and means for causing each clutch to slip at a torque less than that at which the fabric will slip on the roll causing said roll to overrun said gear train and turn at a roll surface speed corresponding to the linear speed of the portion of the fabric passing over said roll.

2. Apparatus as defined in claim 1 wherein said speed control means is a dynamoelectric machine.

3. Apparatus as defined in claim 1 wherein a slip clutch is provided for each roll of said hold back roll assembly except the first roll at the entry end thereof.

4. Apparatus as defined in claim 3 wherein means are provided for adjusting the torque at which each clutch will slip.

5. Apparatus as defined in claim 4 wherein each of said clutches is a friction clutch, the clutches being operated by fluid pressure from a common fluid pressure source so that each clutch transmits a controlled maximum torque.

6. Apparatus as defined in claim 5, wherein the torque adjusting means includes means for adjusting the fluid pressure applied to said clutches.

7. An apparatus for conveying and stretching tire cord fabric, comprising:
  (a) means for pulling tire cord fabric through the apparatus;
  (b) a plurality of rolls for successively engaging and tensioning tire cord fabric to stretch the fabric;
  (c) means operatively connected to the plurality of rolls for driving said rolls;
  (d) means interposed between the driving means and plurality of rolls to successively increase the tension applied on the fabric by the first roll to engage the fabric, said means including:
    (1) means for adjusting the torque of each of said plurality of rolls; and
    (2) means for permitting rotation of each of said plurality of rolls at a peripheral speed corresponding to the linear speed which the fabric moves over said roll, when the adjusted torque on said roll is exceeded.

8. The apparatus of claim 7, wherein the driving means includes a dynamo-electric machine.

9. The apparatus of claim 8, which includes a gear train coupling the rolls together for unitary rotational movement.

10. The apparatus of claim 9, wherein the means for permitting rotation of each of said plurality of rolls includes a slip clutch interposed between the gear train and each roll which increases the tension applied on the fabric by the first roll to engage the fabric.

11. The apparatus of claim 10, wherein the torque adjusting means includes means for adjusting the clutch for slipping at a predetermined torque.

References Cited

UNITED STATES PATENTS

| | | | |
|---|---|---|---|
| 2,745,134 | 12/1968 | Collins | 28—71.3 XR |
| 2,846,752 | 8/1958 | Lessig. | |
| 2,932,078 | 4/1960 | Wilson | 28—71.3 XR |
| 2,947,060 | 8/1960 | Umstott | 28—1 |
| 2,955,345 | 10/1960 | Howe | 28—71.3 XR |
| 3,243,845 | 4/1966 | Cassel. | |
| 3,268,142 | 8/1966 | Macamson | 26—54 XR |
| 2,105,824 | 1/1938 | Simonds | 226—10 |
| 2,135,516 | 11/1938 | Hurxthal | 226—10 |
| 2,248,333 | 7/1941 | Burbank | 226—37 XR |
| 2,557,417 | 6/1951 | Driesel | 226—37 |

FOREIGN PATENTS

| | | |
|---|---|---|
| 1,350,801 | 12/1963 | France. |
| 690,165 | 4/1953 | Great Britain. |

ROBERT R. MACKEY, Primary Examiner

U.S. Cl. X.R.

28—1, 71.3